March 29, 1938. R. T. HENDRICKSON 2,112,811
MOTOR VEHICLE
Filed May 16, 1935  3 Sheets-Sheet 1
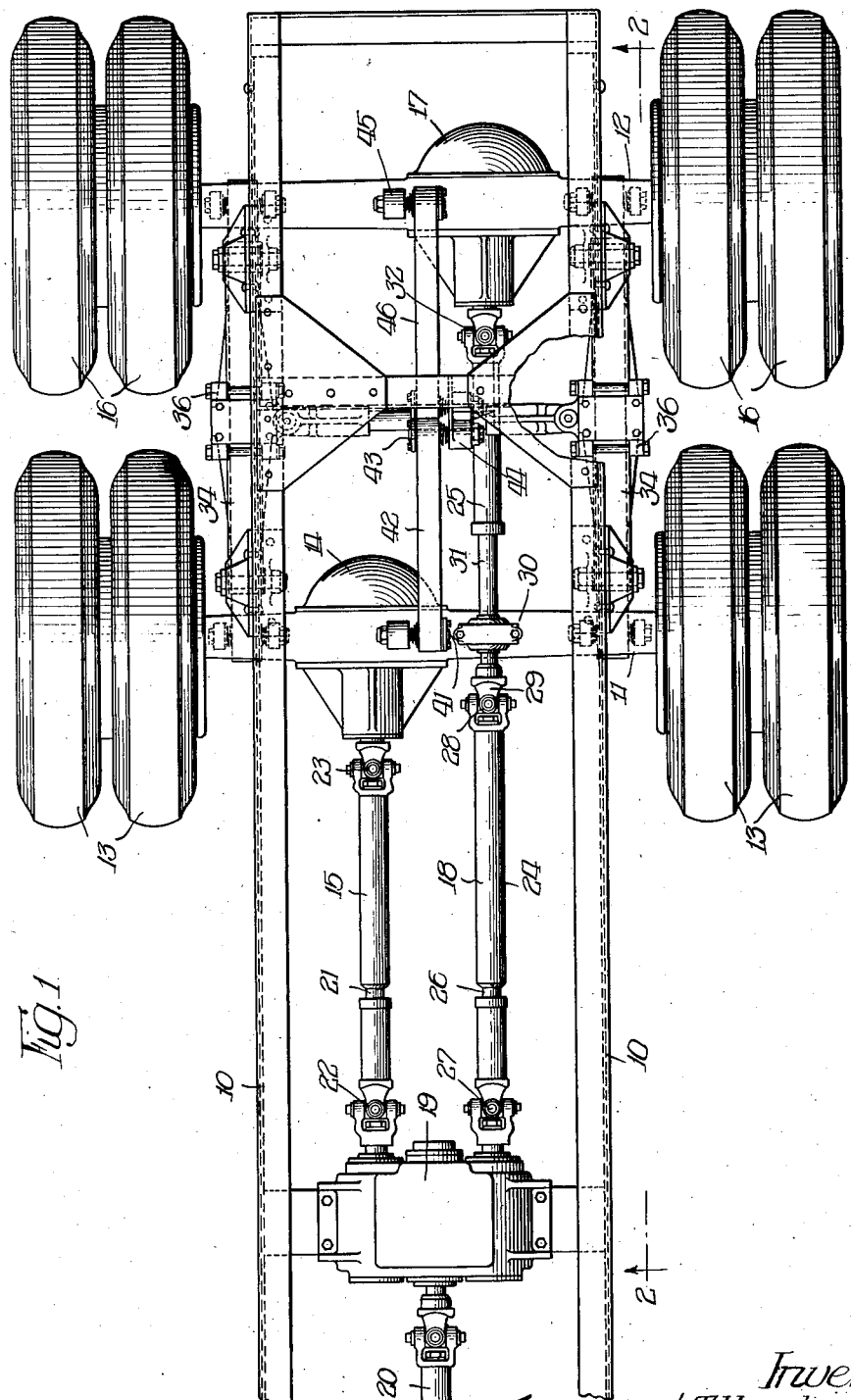

March 29, 1938. R. T. HENDRICKSON 2,112,811
MOTOR VEHICLE
Filed May 16, 1935 3 Sheets-Sheet 2
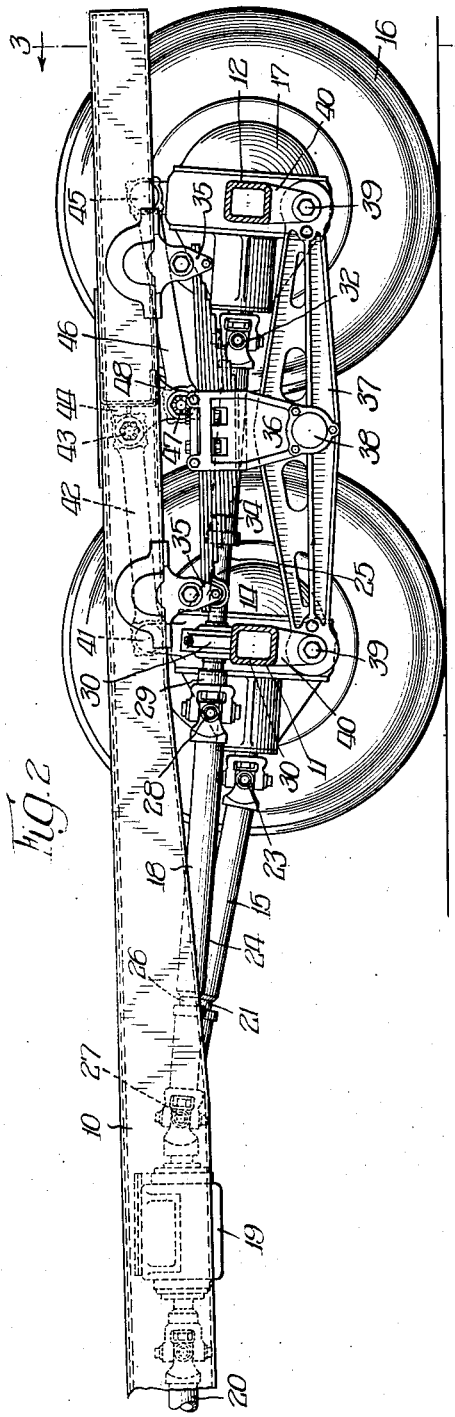
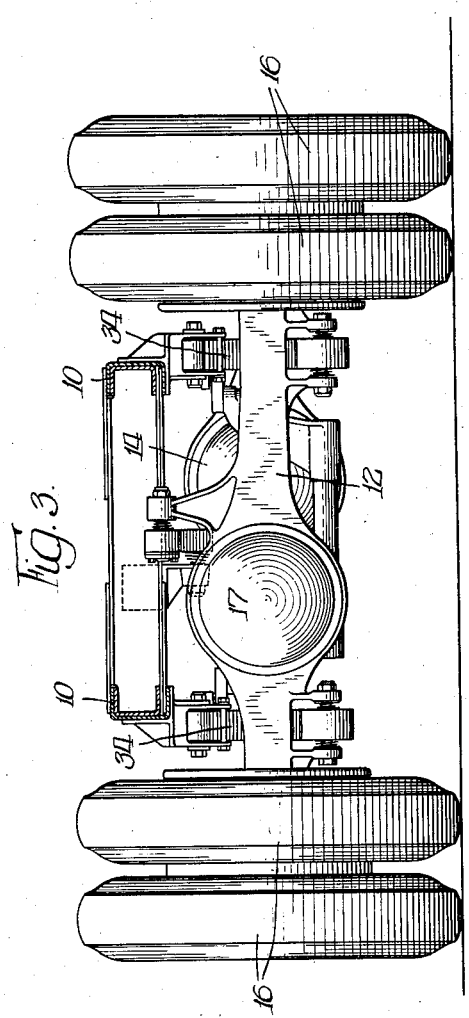
Inventor:
Robert T. Hendrickson,
By Cromwell, Greist & Warden
Attys.

March 29, 1938. R. T. HENDRICKSON 2,112,811
MOTOR VEHICLE
Filed May 16, 1935 3 Sheets-Sheet 3
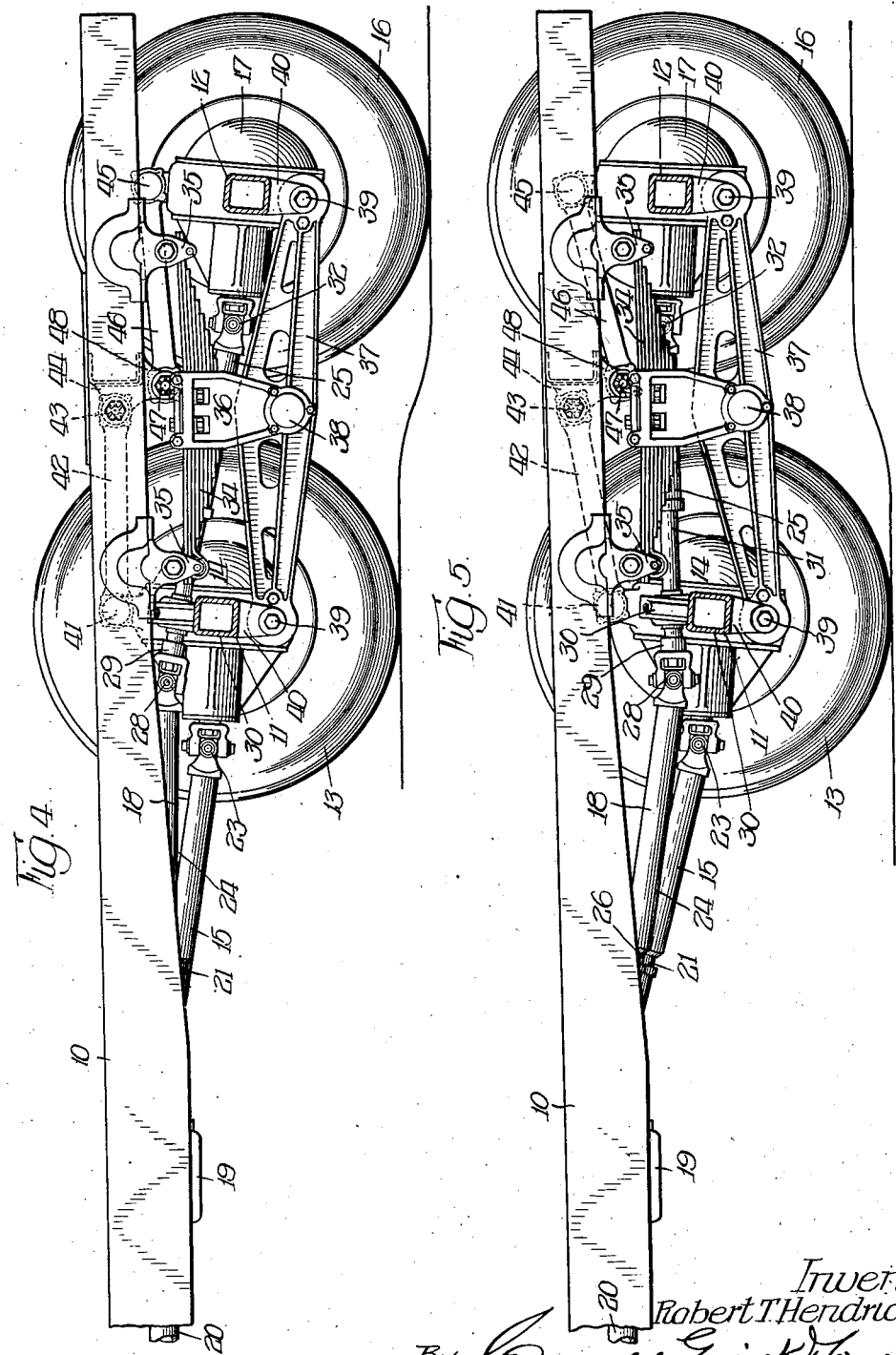
Inventor:
Robert T. Hendrickson Patented Mar. 29, 1938

2,112,811

UNITED STATES PATENT OFFICE 2,112,811

MOTOR VEHICLE

Robert T. Hendrickson, Chicago, Ill., assignor to Hendrickson Motor Truck Co., Chicago, Ill., a corporation of Illinois Application May 16, 1935, Serial No. 21,704

5 Claims. (Cl. 180—22)

This invention has to do with heavy duty motor vehicles of the type equipped with four rear drive wheels, and particularly to the mounting of the axle housings relative to the chassis frame to permit the wheels to move up and down freely to conform to irregularities in the roadway.

In the constructions heretofore employed, the maintenance of a fixed angular relation of the axle housings and differentials to the frame, during up and down movement of the wheels results in a modification of the angle of the axle housings to the propeller shafts which tends to permit binding and undue friction.

The primary object of the present invention is to provide an improved mounting for the four rear drive wheels and their axle housings, which mounting permits the wheels to move up and down freely with relation to each other while maintaining, between the axle housings and the propeller shafts, a favorable angle in the vertical plane of the latter.

Other objects and advantages of the invention will be evident to those skilled in the art upon a full understanding of the novel construction, arrangement and operation of the mounting.

One form of the invention is presented herein for purposes of exemplification but it will, of course, be understood that the invention is susceptible of embodiment in other structurally different forms coming equally within the comprehensive scope of the appended claims.

In the drawings presented herewith, forming a basis for the following descriptive specification of a preferred embodiment, Fig. 1 is a plan view of the rear end of a motor vehicle chassis equipped with the improved axle housing mounting;

Fig. 2 is a side view partially in section of such a construction with the wheels upon a level, the section being taken on the line 2—2 of Fig. 1;

Fig. 3 is a rear view partially in section on the line 3—3 of Fig. 2; and

Figs. 4 and 5 are views similar to Fig. 2 but with the wheels occupying different levels with relation to a horizontal and the chassis frame.

Having reference to the drawings, the chassis includes a frame 10 and two rear axle units 11 and 12 on which the rear end of the frame is supported. The wheels 13 carrying the rear axle 11 are driven through a differential 14 from a short propeller shaft 15 while the wheels 16 carrying the rear axle 12 are driven through a differential 17 from a separate relatively long propeller shaft 18.

The differentials 14 and 17 and the propeller shafts 15 and 18 connected with the same are offset laterally with respect to the central line of the frame 10, the differential 14 with the shaft 15 being located nearer one side of the frame and the differential 17 with its shaft 18 being located in generally parallel spaced relation thereto but nearer the other side of the frame. Both of the propeller shafts 15 and 18 are connected at their forward ends to a joint differential 19 which is mounted on the frame 10. The differential 19 is driven from a centrally arranged propeller shaft 20 which extends rearwardly from the motor, clutch and transmission assembly on the front end of the frame.

In the particular embodiment shown, the frame 10 is supported on the two rear axle units 11 and 12 by an advantageous spring and linkage arrangement disclosed in Hendrickson Patent No. 1,658,164 and Hendrickson Patent No. 1,994,133, but it will be understood, of course, that other supporting means may be employed without detracting from the benefits obtainable with the supplemental linkage arrangement for modifying the angle between the axle housings and the frame which forms the subject matter of the present invention.

The propeller shaft 15 for the forward unit of the dual axles is of extensible two-part telescoping construction at 21, is provided at its front and rear ends with universal joints 22 and 23, and extends downwardly and rearwardly at a slight inclination from the differential 19 to the differential 14.

The propeller shaft 18 of the rearmost axle unit, which is longer than the propeller shaft 15, is of extensible two-part telescoping construction at 26, is provided at its front and rear ends with universal joints 27 and 28, and extends downwardly and rearwardly at a little more gradual inclination from the differential 19 to the front end 29 of the rear shaft section 25, which end is located at a point above and in advance of the housing 30 of the forward axle unit.

The rear section 25 of the propeller shaft 18 is of extensible two-part telescoping construction at 31, is arranged substantially in axial alignment with the front section 24 as a rearward continuation of the latter when the two rear axle units are in their normal positions, overlies the housing 30 of the first axle unit, and is provided at its rear end with a universal joint 32 which is connected to the differential 17. The rear section 25 is mounted adjacent its front end in a bracket 33 which is located on top of the axle housing 30 and is preferably formed as an integral part of the latter.

As hereinbefore indicated, the chassis frame is supported at opposite sides upon semi-elliptical leaf springs 34 through shackles 35 at the ends of the springs, which shackle connections are fixed at one end of the springs and float at the other end as is usual in this type of spring mounting so as not to interfere with flexing of the spring. These springs are provided intermediate their ends with downwardly extending brackets 36 which are bifurcated to receive carrying beams 37 which preferably increase in thickness toward their medial points and are pivoted on pins 38 at such medial points to the lower ends of the brackets 36. The ends of the beams 37 extend beneath the housings 11 and 12 and are there pivoted at 39 to the brackets 40 which are fixed relative to the axle housings.

This construction distributes the weight of the rear end of the chassis frame equally between all four rear drive wheels, and any upward or downward movement of one or more of the wheels will not affect such equalization. Furthermore, the wheels are perfectly free to move up or down relative to each other in traveling over bumps or through depressions forming irregularities in the roadway.

The Hendrickson Patents Nos. 1,658,164 and 1,994,133 disclose linkage connections to the axle housings whereby to insure the maintenance of the axle housings at a fixed angle perpendicular to the chassis frame notwithstanding up and down movement of the wheels and axles. The present invention comprehends means for effecting a slight tilting of the axle housings with a modification of the angle relative to the frame as the wheels move upwardly or downwardly in order to maintain favorable approximately normal angles between the vertical planes through the axle housings and the respective propeller shafts.

To the upper portion of the forward axle housing 11 is pivoted at 41 a link 42 which at its rear end is pivoted at 43 to a bracket 44 fixed upon the chassis frame 10. Similarly, to the upper portion of the rear axle housing 12 is pivoted at 45 the rear end of a link 46, the forward end of which link is pivoted at 47 to a bracket 48 which may be associated in an integral casting with the bracket 44. It is to be noted that the pivotal points 43 and 47, disposed at points intermediate the two axle housings 11 and 12, are vertically and horizontally offset.

By comparison of Figs. 2, 4 and 5 it will be observed that as the two wheels forming the forward unit of the dual axle construction assume a position above or below the wheels forming the rear unit of such construction, the angle of the median planes through the forward and rear axle housings to each other and to the chassis frame is modified through a tilting of the same relative to the frame.

Comparing Fig. 4 with Fig. 2 it will be observed that as the front wheels 13 assume an elevated position relative to the frame and the rear wheels 16 assume a lowered position relative to the frame the links 42 and 46 assume modified angles to the frame whereby the pivot point 41 upon the housing 11 is moved in an arcuate path upwardly and forwardly relative to the fixed point 43 and the pivot point 45 upon the housing 12 is moved downwardly and rearwardly relative to the fixed point 47.

Comparing Fig. 5 with Fig. 2 it will be observed that the lowering of the wheels 13 and the elevating of the wheels 16 relative to the chassis frame results in a tilting of the axle housings 11 and 12 and a shifting of the pivot points 41 and 45 in the opposite direction from that just described.

The result of such tilting is to maintain a most favorable angle between the axle housings and their respective propeller shafts, that is to say, approximately normal thereto, the tilting of the housings being in a plane including the vertical plane of the propeller shaft and in substantial alignment therewith. The degree of tilting varies, it will be noted, with the extent to which the respective wheels rise above or fall below the general level, the tilting of the axle housings being such as to inscribe generally an arcuate path about the universal connection with its propeller shaft.

The particular embodiment of the invention herein illustrated and heretofore described is not to be construed as limiting the invention to such embodiment, as other structurally modified forms and arrangements are, of course, contemplated without departure from the essence of the invention. For instance, it will be apparent that instead of the links 42 and 46 extending towards and being connected to the frame at intermediate points 43 and 47 as illustrated, the link 42 may be extended forwardly and the link 46 extended rearwardly to independent connections with the frame at points in front of and behind the wheels instead of between the wheels, in which case the links 42 and 46 would be connected with the frame as before at vertically offset points but to the offset relation would be reversed, that is to say, the connection of the link 42 with the frame would be below rather than above the point of connection of the link 46 with the frame as measured by the horizontal.

I claim:

1. In a motor vehicle of the dual rear axle driven type, a chassis frame, a propeller shaft and a differential associated with each axle housing, a rigid cross connection extending between the lower sides of the housings and pivoted intermediate thereof to the frame, and means to tilt the axle housings and associated differentials to maintain a substantially constant angle to the propeller shafts to compensate for up and down movements of the axles relative to the frame due to irregularities in the roadway, said means comprising independent link connections between the upper sides of the housings and the frame at points on the frame vertically and horizontally offset.

2. In a motor vehicle of the dual rear axle driven type, a chassis frame, a propeller shaft and a differential associated with each axle housing, a bracket spring-connected to the frame, a cross connection extending between one side of the housings and pivoted intermediate thereof to the bracket, and means to tilt the axle housings and associated differentials to maintain a favorable substantially constant angle to the propeller shafts to compensate for up and down movements of the axles relative to the frame due to irregularities in the roadway, said means comprising independent link connections between the opposite sides of the housings and the frame, the point of link connection to the frame of one of the housings being below and horizontally offset from the point of connection to the frame of the other housing.

3. In a motor vehicle of the dual rear axle driven type, a chassis frame, a propeller shaft and a differential associated with each axle housing, a bracket spring connected to the frame, a cross connection extending between the lower sides of the housings and pivoted intermediate thereof to the bracket, and means to tilt the axle housings and associated differentials to maintain a favorable substantially constant angle to the propeller shafts to compensate for up and down movements of the axles relative to the frame due to irregularities in the roadway, said means comprising independent link connections between the upper sides of the housings and the frame at points on the frame vertically and horizontally offset and intermediate the two axles, the point of connection to the frame of the rear housing being below and to the rear of the point of connection to the frame of the forward housing.

4. In a motor vehicle, the combination with a chassis frame, two rear axles and axle housings, and propeller shafts for the axles, of longitudinally extending rigid side beams pivotally connected with the axle housings below the axles, springs on the chassis, brackets carried by the medial portion of the springs, the beams fulcrumed on the brackets, and longitudinally extending rigid links pivotally connecting vertically and horizontally offset points on the frame with the axle housings above the axles, whereby to require each axle and its housing to follow its respective propeller shaft up and down without appreciable angular change relative to the propeller shafts.

5. In a motor vehicle of the dual rear axle driven type, a chassis frame, a propeller shaft and a differential independently associated with each axle housing, a rigid cross connection extending between the lower sides of the housings and pivoted intermediate thereof to the frame, and means to tilt the axle housings and associated differentials to maintain each a favorable angle to its propeller shaft to compensate for up and down movements of the axles relative to the frame due to irregularities in the roadway, said means comprising independent link connections between the upper sides of the housings and the frame at points on the frame vertically offset and intermediate the two axles.

ROBERT T. HENDRICKSON.